Patented Dec. 5, 1933

1,938,202

UNITED STATES PATENT OFFICE 1,938,202

HYDROGEN PRODUCTION

Roger Williams, Wilmington, Del., assignor, by mesne assignments, to E. I. du Pont de Nemours & Company, Wilmington, Del., a corporation of Delaware No Drawing. Application September 12, 1930
Serial No. 481,595

15 Claims. (Cl. 23—212)

This invention relates to the manufacture of hydrogen and particularly to a process for producing hydrogen from methane by reaction thereof with steam.

It is known that methane can be converted into hydrogen by interaction with steam. The chemical reactions involved appear to be:

$$CH_4 + 2\ H_2O = CO_2 + 4H_2$$
$$CH_4 + H_2O = CO + 3H_2.$$

Thus, for example, it has been proposed to manufacture hydrogen by submitting a gaseous mixture of steam and methane at temperatures above 700° C. to the action of a nickel catalyst. This process has apparently found no commercial application, presumably because at these high reaction temperatures it is difficult to maintain catalyst activity and the reaction products will contain considerable amounts of carbon monoxide unless excessive quantities of steam are employed. Furthermore, such processes as have hitherto been proposed have suffered from the difficulty that under even the most favorable conditions the reaction products contain not only carbon monoxide and carbon dioxide but also some unconverted methane. The isolation of pure hydrogen from this mixture is expensive, particularly since the complete removal of methane from hydrogen contaminated therewith is accomplished only with difficulty. Inasmuch as the presence of methane in hydrogen is very objectionable in some processes in which the latter is utilized, it is highly desirable that a method be available for producing from methane by catalysis hydrogen uncontaminated with methane.

It has been proposed to manufacture hydrogen by the reaction of steam and hydrocarbons at high temperature in the presence of lime, it being claimed that the presence of lime results in the production of hydrogen free from carbon dioxide. Actually, however, lime alone is not a catalyst for the conversion of steam and methane to hydrogen; in fact in the presence of lime any substantial formation of hydrogen is obtained only at temperatures so elevated that the reaction proceeds whether lime is present or not. Thus, on the one hand, at the very elevated temperatures at which hydrogen might be formed lime is incapable of absorbing carbon dioxide associated with the hydrogen and, on the other hand, at those temperatures at which carbon dioxide absorption could occur the methane-steam reaction does not proceed to any substantial degree in the presence of lime alone. This doubtless accounts for the fact that the process referred to has found no industrial application in spite of the great need for an economical method for producing hydrogen from methane.

It is the object of the invention of this application which is in part a continuation of my application 266,163 to provide a process for the manufacture of hydrogen substantially free from methane and oxides of carbon by the reaction of steam and methane.

Other objects and advantages of the invention will be apparent as it is better understood by reference to the following specification in which its details and preferred embodiments are described.

I have found that the interaction of steam and methane can be effected at relatively low temperatures to yield hydrogen substantially free from methane and oxides of carbon by submitting a mixture of steam and methane to the combined action of lime and a methane-steam conversion catalyst. I thereby obtain a considerably purer grade of hydrogen than results under conditions otherwise the same using either the methane-converting catalyst or lime alone.

In order to produce hydrogen by reaction of methane by passing methane and steam over lime per se, it is known that a very elevated temperature must be employed, for instance, in the neighborhood of 1500° C., to get satisfactory conversion, while at temperatures below 700° C., substantially no conversion is obtained. With methane conversion catalysts per se at temperatures below 700° C., the most advantageous operating conditions of space velocities, steam to gas ratios, pressure, etc., yield in many cases conversion well under 50%. The increase in yield which is obtained when a methane conversion catalyst and lime are used simultaneously in accordance with the present invention is higher than would be expected, as the percentage conversion is greater than the summation of those obtained by the use of the catalyst and lime separately. It is apparent, therefore, that the use of a methane conversion catalyst and lime simultaneously results in a more efficient and economical process for the preparation of hydrogen.

As a methane conversion catalyst to be associated with lime I employ one or more of the elements that will catalyze the reaction of steam and methane to form hydrogen, with which elements oxides of other elements, acting as promoters, may advantageously be mixed or chemically combined. Among the elements previously disclosed as catalysts for methane conversion are, for example, nickel and cobalt. Promoters that may be employed include the oxides of aluminum, chromium, cerium, zirconium, and others mentioned in my copending application, Serial No. 118,600. Combinations of lime with known methane conversion catalysts may consist of lime and nickel; lime and cobalt; lime, nickel and cobalt; lime, nickel, and chromium; lime, cobalt and chromium; lime, nickel and cerium; lime and cobalt chromate; lime, cobalt and cerium; lime, nickel, cerium and aluminum; lime and nickel chromate; etc.

The activity of some elements that are normally catalysts for the methane-steam reaction may be improved and elements that are ordinarily poor catalysts may be made active for the reaction, by observing certain conditions. Thus, for example, there are certain elements whose activity appears to be impaired by their tendency to exist only in an oxidized state during the methane-steam reaction. Such elements show an improved behavior if the gaseous mixture of steam and methane brought into contact therewith contains some hydrogen. Similarly an improvement results if the catalytic element is intimately associated with copper, or another element that is not readily oxidized under the conditions of operation. For example, then, the contact mass may consist of lime, iron and copper; lime, cobalt and copper; or lime, nickel and copper. Or the contact mass may be lime and iron, over which a gaseous mixture of steam and methane, together with some hydrogen, is passed.

For the most satisfactory results the preparation of the catalyst as well as the hydrogen producing process itself should be carried on in the absence of catalyst poisons, particularly the halogens and sulphur, and compounds thereof.

It will be understood that the lime used in the process is not employed as a promoter of the catalyst associated therewith; at least, not in the usual sense of the word promoter which customarily designates a substance added to a catalyst in relatively small proportions to enhance its activity. In the process described herein the lime is the preponderant constituent of the solid material with which the gaseous reactants contact, it being necessary to use only a relatively small proportion of catalyst, say from one to ten per cent. by weight of the lime. Nor does the lime perform merely the function of an inert support since in the course of the reaction it is gradually converted to calcium carbonate.

The charge of lime and catalyst may be prepared in various ways, the primary requisite being that the lime and catalyst be prepared and disposed within the reaction apparatus in such a manner that the gases to react may contact practically simultaneously with catalyst and lime. Thus, for example, a suitable charge may be made by dry mixing lime and a catalytic element or catalytic elements, or suitable compounds thereof. Also lime may be impregnated with solutions of salts of the catalytic metals, such as nitrates, acetates, etc., which upon burning the lime are converted into catalytically active form. Or, if desired, granules or lumps of lime may be mingled with particles of catalyst carried on suitable supports, such as pumice, asbestos, etc.

With regard to proportions of materials, it is desirable that the amount of lime employed be at least that equivalent to the methane used. In other words, each mole of methane converted should have the opportunity of contacting with at least one mole of lime to ensure absence of oxide of carbon in the products. Furthermore, I have found that for the most satisfactory results with respect to purity of the hydrogen produced the volume ratio of steam to methane used should be at least 2:1.

The process is not limited to the use of any specific temperature or range of temperatures. Various considerations, including the purity of the methane used, the cost of steam, size and shape of apparatus available and the specific nature of the catalyst employed will determine the optimum temperature of reaction under any particular circumstances. Generally speaking, however, temperatures within the range of 300–550° C. are preferred as being adapted for the production of most economical and satisfactory results. In any event the temperature should not be as high as the decomposition temperature of calcium carbonate. If temperatures above the decomposition temperature of the calcium carbonate are employed oxide of carbon will appear in the hydrogen produced. While, on the other hand, the minimum temperature will be determined by the activity of the particular catalyst used. As lime obtained from different sources and by different methods of preparation varies in its ability to absorb carbon dioxide the exact optimum operating conditions cannot be prescribed for all cases.

The reaction may be carried out in either a continuous or discontinuous manner. That is, if a fixed charge of lime and catalyst is employed, so much of the lime will ultimately be converted to calcium carbonate that the efficiency of the methane conversion will be greatly lowered. The lime catalyst charge should then be replaced with a fresh charge, the discharged material being preferably regenerated for further use by heating to convert the calcium carbonate to calcium oxide. If desired two or more converters may be used, continuous production being obtained by having one converter in operation while one or more are being heated to regenerate the spent contact mass.

On the other hand, continuous operation of the process may be acomplished by employing one of the known types of apparatus in which a continuously replaced mass of solid material may be treated with a gaseous stream. In such an apparatus the lime and catalyst may be continuously introduced and withdrawn at such a rate that there is always present an adequate amount of active and efficient contact mass. Preferably the steam-methane mixture is passed in a direction opposite to that of the moving solid.

The normal reaction of steam and methane is decidedly endothermic. The process herein described has the advantage of being but slightly endothermic so that when the gaseous reactant has been brought to reaction temperature, by heat exchange with the hot gaseous products or by other means, but little heat need be added to support the reaction. Such heat as is required may be supplied in various ways. For example, the gases entering the reaction apparatus may be preheated above reacting temperature to such an extent that the heat absorbed by the reaction will not lower the temperature below reacting temperature; or the heat may be supplied from an external source, as by electrical heating; or oxygen or air may be added to the gases before or during reaction to furnish the necessary heat by combustion.

A further feature of the invention consists in the discovery that the process hereinbefore described can be carried out more economically and satisfactorily at pressures in excess of atmospheric. Not only does the reaction proceed more satisfactorily at increased pressure but also important economies can be realized because of the decreased size of reaction apparatus and the smaller requirements for heat exchange apparatus. Pressures of from one to fifty atmospheres are suitable although higher pressures may also be used.

Although the invention is susceptible of considerable variation in the manner of its application to the practical manufacture of hydrogen, for purposes of illustration the following example is given to indicate a typical method of practising the invention.

Example 1.—A contact mass is prepared by thoroughly mixing calcium hydroxide, 8-14 mesh. with a similarly sized nickel chromate catalyst which is prepared from a 6% nickel nitrate solution by adding ammonium bichromate solution and ammonia to neutrality. The neutralized solution is heated at about 100° C. for one hour, cooled slowly with stirring, and the precipitate washed and dried at 125° C. After igniting at 350-400° C. it is formed into pellets of 8-14 mesh. It is then mixed with the calcium hydroxide giving the ratio CaO:Ni of 9:1. The combined lime and catalyst is disposed within a reaction apparatus adapted to withstand a pressure of 10 atmospheres or more. The apparatus is equipped with suitable heating means, such as electrical heating coils, for adding such heat as may be necessary for maintenance of the reaction. A gaseous mixture of steam and methane in the volume ratios of 13:1, respectively, and free from sulphur compounds is supplied to the furnace wherein it passes over the contact mass at a pressure of 10 atmospheres and a space velocity of 300. The temperature of the contact mass is maintained at approximately 540° C. After removing the excess steam by cooling the gaseous product obtained in this manner was found to consist of 98% hydrogen substantially free from carbon monoxide and carbon dioxide, giving an approximately 92% conversion.

By conducting the same reaction under the same conditions but without the lime being present a gas containing 15.8% carbon dioxide, 1.1% carbon monoxide, and 66.5% hydrogen was produced giving only 51% conversion.

Example 2.—Prepare a nickel catalyst by the precipitation of pure nickel nitrate in dilute aqueous solution with a dilute oxalic acid solution, wash the precipitate thoroughly, filter, dry at 125° C., ignite at 350° C., and make up into pellets of suitable size, say 8-14 mesh. The type of reaction vessel employed will govern in large measure the size of the pellets.

These pellets are introduced into a reaction vessel, admixed with pellets (of approximately the same size) of lime in the ratio of CaO/Ni=9 in such a way that the maximum possible contact of the nickel catalyst with the gases whose reaction the catalyst is to promote is assured.

The catalyst is then reduced with hydrogen at one atmosphere pressure from, say, 200-500° C. The conversion of methane, natural gas, etc. is then carried out at 10 atmospheres pressure and 550° C. with from 4:1 to 8:1 steam to gas ratio and a methane space velocity of 100-250.

The space velocity, which is the volume of gas flowing under standard conditions of temperature and pressure per unit volume of catalyst per hour, may vary within fairly wide limits. A space velocity of as low as 100 or even lower can be successfully employed with some catalysts while a space velocity of 5000 or even higher may often be found suitable.

When the spent condition of the lime is indicated by the presence of substantial amounts of methane or carbon oxide in the gaseous product, the charge is regenerated, the calcium carbonate being converted to oxide by heating at atmospheric pressure. After reduction of the contact mass as in the first instance, it may be employed for further reaction.

As previously indicated the process may be made a substantially continuous one by providing two or more reaction vessels, so that while one is being used for methane conversion the charges in one or more may be in process of reactivation. Or if desired a reaction vessel may be employed which is adapted for the continuous withdrawal of the spent lime-catalyst charge and replacement thereof with fresh material.

Various changes may be made in the method described without departing from the invention or sacrificing any of the advantages thereof.

I claim:

1. The process of producing hydrogen which comprises subjecting a mixture of steam and methane, in the volume ratio of at least 2:1, at a pressure within the range of from 1 to 50 atmospheres and a temperature within the range of from about 300° C. at 550° C. to the combined action of a nickel catalyst and lime, the lime being present in preponderating amount.

2. The process of producing hydrogen which comprises subjecting a mixture of steam and methane to the combined action of a methane-steam converting catalyst and lime, the lime being present in preponderating amount, at a temperature below approximately 550° C.

3. In the process for the preparation of hydrogen the steps which comprise subjecting a mixture of methane and steam to the action of a methane conversion catalyst in the presence of lime, the lime being present in preponderating amount; when oxides of carbon appear in the hydrogen produced, regenerating the lime and returning it again to the reaction.

4. In a continuous process for the preparation of hydrogen the steps which comprise subjecting a mixture of methane and steam to the action of a catalytic mass containing a methane conversion catalyst in the presence of lime, the lime being present in preponderating amount while simultaneously regenerating a similar catalytic mass, and when oxides of carbon appear in the hydrogen produced subjecting the methane and steam to the regenerated catalytic mass.

5. The process of producing hydrogen which comprises subjecting a mixture of steam and methane at a pressure within the range of from 1 to 50 atmospheres to the combined action of a methane-steam converting catalyst and lime, the lime being present in preponderating amount.

6. The process of producing hydrogen which comprises subjecting a mixture of steam and methane at a temperature within the range of from about 300° C. to 550° C. to the combined action of a methane-steam converting catalyst and lime, the lime being present in preponderating amount.

7. The process of producing hydrogen which comprises subjecting a mixture of steam and methane to the action of a heated body of lime containing from about 1% to about 10% of nickel at a temperature between approximately 300° C. and 550° C.

8. The process of producing hydrogen which comprises subjecting a mixture of steam and methane to the combined action of a methane-steam converting catalyst and an alkaline earth oxide, at a temperature between approximately 300° C. and 550° C., the alkaline earth oxide being present in preponderating amount.

9. The process of producing hydrogen which comprises subjecting a mixture of steam and methane to the combined action of a methane-steam converting catalyst and an alkaline earth oxide, the alkaline earth oxide being present in preponderating amount, at a temperature below approximately 550° C.

10. The process of producing hydrogen which comprises subjecting a mixture of steam and methane to the combined action of a nickel catalyst and an alkaline earth oxide, at a temperature between approximately 300° C. and 550° C., the alkaline earth oxide being present in preponderating amount.

11. In the process for the preparation of hydrogen the steps which comprise subjecting a mixture of methane and steam to the action of a methane conversion catalyst in the presence of a preponderating amount of an alkaline earth oxide, when oxides of carbon appear in the hydrogen produced, regenerating the alkaline earth oxide and returning it again to the reaction.

12. In a continuous process for the preparation of hydrogen the steps which comprise subjecting a mixture of methane and steam to the action of a catalytic mass containing a methane conversion catalyst in the presence of a preponderating amount of an alkaline earth oxide, while simultaneously regenerating a similar catalytic mass, and when oxides of carbon appear in the hydrogen produced subjecting the methane and steam to the regenerated catalytic mass.

13. The process of producing hydrogen which comprises subjecting a mixture of steam and methane to the combined action of a nickel catalyst and lime at a temperature between approximately 300° C. and 550° C., the lime being present in preponderating amount.

14. The process of producing hydrogen which comprises subjecting a mixture of steam and methane at a pressure higher than atmospheric to the combined action of a methane-steam converting catalyst and lime at a temperature between approximately 300° C. and 550° C., the lime being present in preponderating amount.

15. The process of producing hydrogen which comprises subjecting a mixture of steam and methane, in the volume ratio of at least 2:1, to the combined action of a methane-steam converting catalyst and lime at a temperature between approximately 300° C. and 550° C., the lime being present in preponderating amount.

ROGER WILLIAMS.